United States Patent [19]

Saito

[11] Patent Number: 5,154,977
[45] Date of Patent: Oct. 13, 1992

[54] RUBBER-LAMINATED MATERIAL FOR GASKETS

[75] Inventor: Hiroshi Saito, Nara, Japan

[73] Assignee: Nichias Corporation, Tokyo, Japan

[21] Appl. No.: 596,237

[22] Filed: Oct. 12, 1990

[30] Foreign Application Priority Data

Oct. 13, 1989 [JP] Japan ................................. 1-12670

[51] Int. Cl.$^5$ ............................................ B32B 15/08
[52] U.S. Cl. .................................. 428/457; 428/462; 428/463; 428/465; 428/472; 428/492
[58] Field of Search ............... 428/457, 472, 463, 461, 428/465, 469, 462, 492

[56] References Cited

U.S. PATENT DOCUMENTS 2,957,784  10/1960  Schiefelbein ........................ 428/472
4,740,427   4/1988  Ochiumi et al. ................. 428/461 X
4,882,215  11/1989  Ushio et al. ..................... 428/149 X Primary Examiner—Thomas J. Herbert, Jr.
Attorney, Agent, or Firm—Cushman, Darby & Cushman

[57] ABSTRACT

A rubber-laminated material for gaskets is disclosed in which a primer layer is formed on a one-surface or on each of opposite surfaces of a metal plate subjected to chemical conversion treatment and a rubber layer is laminated on said primer layer. The primer layer is composed of high-reactive xylene denatured phenol resin having an oxymethylene group or an acetal group and the rubber layer is composed of NBR rubber. A chromium sealing layer of a chromic (III) acid or a chromic (VI acid is formed on the chemical conversion treated surface coated with a phosphate.

5 Claims, 1 Drawing Sheet

RUBBER-LAMINATED MATERIAL FOR GASKETS

BACKGROUND OF THE INVENTION

The present invention relates to a material for gaskets in which a rubber layer is laminated on a one or each of opposite surfaces of a metal plate, and the gasket produced from the material has an advantage in that it is excellent in adhesion to fluids (an antifreeze and hot water) to be used in an engine cooling system of a car so that no layer separation is cause.

A rubber-laminated material for gaskets is formed in such a manner that a metal substrate formed, for example, of a carbon steel plate, a stainless steel plate, an aluminum alloy plate, a plated steel plate, or the like is coated with rubber and formed into a sheet. The thus obtained material is punched into predetermined shapes so as to be used as gaskets for various equipment.

FIG. 1 is a section showing the conventional rubber-laminated material for gaskets. The process of producing the illustrated material for gaskets will be described in the order of steps or producing. A substrate steel plate 1 is alkali-degreased, surface-roughed with a shot blast or a Scotch brush, and then phosphate-treated, so that chemical conversion treated layers 2 are formed. Chromic acid treatment is sometimes performed as the chemical conversion treatment for an aluminum alloy plate. Thereafter, coating of a primer mainly containing phenol resin (pure phenol resin or denatured phenol resin such as cresol denatured phenol resin or cashew denatured phenol resin) is performed to thereby form primer layers 3. Then, each of the primer layers 3 is coated to a predetermined thickness with a rubber solution prepared in such a manner that a carbon reinforcing filler, a generally-used vulcanizing agent, and an additive are added to nitrile rubber and the nitrile rubber is dissolved in toluene, an ester group solvent, and a ketone group solvent, and the rubber solution is dried and vulcanized, so that a rubber layer 4 is formed. The rubber layer 4 is coated, in accordance with a use condition of a gasket, with dispersion such as graphite, molybdenum disulfide, or the like, so that a non-adhesive layer 5 is formed. (Up to here, refer to the specification of U.S. Pat. No. 2,957,784.)

In the foregoing conventional rubber-laminated gasket, however, there has been caused a problem in that in the case of using the gasket in an engine cooling system of a car, the primer layers 3 of phenol group resin are invaded by an antifreeze or hot water so that the rubber layers 4 are separated from the metal 1, while the oil resistance and the Freon resistance are sufficient in the case of using the gasket in a refrigerator compressor.

The following five points are considered to be the reasons of the layer separation.

(I) Since a hydroxyl group (—OH) and a methylol group (—CH$_2$OH) of phenol resin which are the principal components of the primer layers 3 are hydrophilic, hot water penetrates into the primer layers 3 and the adhesion surfaces to thereby cause swelling of the phenol resin and reduction of the adhesive force of the surface, so that the separation is caused.

(II) Weak acid phenol resin is reaction-decomposed by an alkali rust preventive (an amine group or a phosphate) contained in an antifreeze, so that the separation is caused.

(III) Pores are formed in the rubber layers 4 by solvent vapor or a vulcanized gas generated when the rubber layers 4 are formed. Hot water or an antifreeze penetrates into the pores to thereby accelerate the reasons I and III.

(IV) Since the chemical conversion treated layers 2 are porous, water molecules are arranged or a moist metallic salt is formed on the metal surface to break the adhesion force between the metal and the primer.

(V) An anode-cathode reaction (an electrochemical reaction) is caused between a metal surface of a gasket end portion formed by punching and the porous, chemical conversion treated layers to thereby generate a hydrogen gas on the chemical conversion treated surface at the cathode side, so that the separation is caused.

SUMMARY OF THE INVENTION

An object of the present invention is to provide a rubber-laminated material for gaskets in which in the case of using the gasket in an engine cooling system of a car or the like, separation of rubber layers from a metal substrate due to fluids (hot water and an antifreeze) of the cooling system is not caused and therefore no leakage of the fluids through the gasket is caused.

Another object of the present invention is to provide a rubber-laminated material for gaskets in which chemical conversion treated layers having high adhesion to primer layers of phenol group resin are provided.

The rubber-laminated material for gaskets according to the present invention has features in that a layer subjected to chromium sealing treatment with a chromic (III) acid or a chromic (VII) acid (particularly, two layers, one being a phosphate (zinc phosphate, iron phosphate) treated layer, the other being a chromium sealing treated layer) is formed on a chemical conversion treated surface of a metal plate, in that a rubber layer laminated on a one surface or each of opposite surfaces is composed of nitrile rubber (particularly, nitrile rubber containing wax having a water repellency effect), and in that a primer layer interposed between the metal plate and the rubber layer is composed of high-reactive xylene denatured phenol resin (particularly, high-reactive xylene denatured phenol resin and epoxy resin) having an oxymethylene group or an acetal group. By the foregoing features and combination thereof, the orientation of water molecules onto the metal surface is prevented, the rust preventing force is improved, the penetration of hot water and an antifreeze from the rubber layer is suppressed, the antifreeze resistance, the hot water resistance, and the like of a primer are improved, so that the foregoing problems in the prior are solved.

DESCRIPTION OF THE PREFERRED EMBODIMENTS

The configuration, operation and effects of the present invention will be described in detail hereunder with reference to examples of the present invention.

EXAMPLE 1

Figure 1:
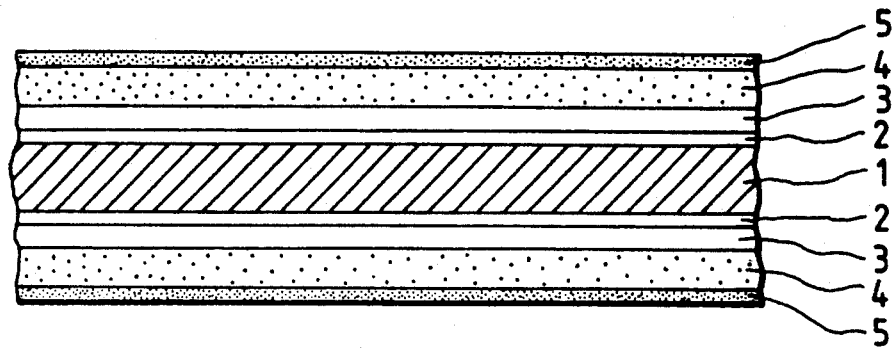
FIG. 1 is a section showing the conventional rubber-laminated material for gaskets.
Figure 2:
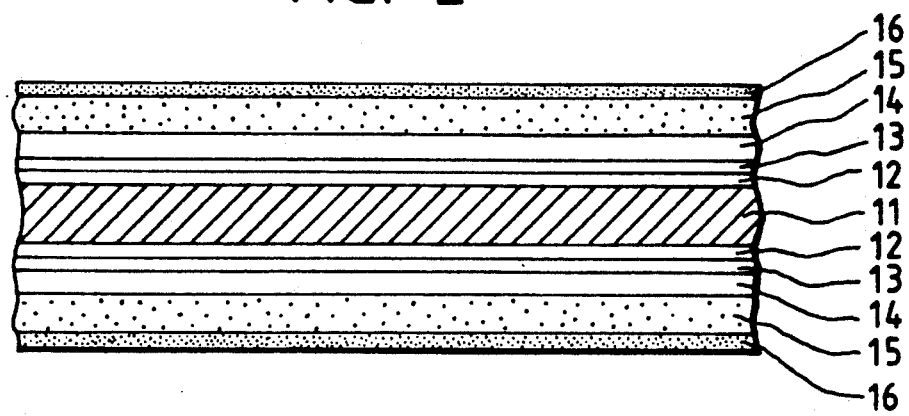
FIG. 2 is a section showing the rubber-laminated material for gaskets according to the present invention.

FIG. 2 is a section showing the rubber-laminated material for gaskets according to the present invention.

The process of producing the illustrated material for gaskets will be described in the order of steps of producing. First, a steel plate cold-rolled in cut length (SPCC) 11 having a thickness of 0.25 mm is prepared. The surfaces of the steel plate are treated with an alkali group degreaser, and roughed with a Scotch bright. Next, iron phosphate treatment is performed and a chromium sealing layer 13 is further formed on each of the porous, iron phosphate treated layers 12 under the condition that a treatment temperature is 65° C., a process time is 5 seconds and an amount of chromium adhesion is 10 mg/m$^2$, so that a rust prevention, chemical conversion treated coating is formed.

Next, 11 weight percent of high-reactive xylene denatured phenol, 2.6 weight percent of phenol novolac epoxy resin, and 6 weight percent of an primer NBR rubber compound having a composition as showing in Table 1 are dissolved into 80.4 weight percent of a mixture solvent of methyl ethyl ketone and methyl isobutyl ketone at a ratio of 9:1 to thereby prepare a primer. The opposite surfaces of the treated steel plate are coated with the primer by use of a reverse roll coater, and heated in an oven at 160°-170° C. for about 2-4 minutes, so that primer layers 14 each having a thickness of 5 μm are formed on the opposite surfaces.

Next, 40 weight percent of NBR rubber compound for laminate having a composition as shown in Table 1 is dissolved into 60 weight percent OF mixture solvent of toluene and propyl acetate at a ratio of 3:1 to thereby prepare rubber solution for laminate. The primer layers 14 are coated with the rubber solution by using a roll coater or a knife coater, dried at 60°-100° C. for 20 minutes so that the solvent is volatilized, and then coated with graphite dispersion. Then, the thus treated primer layers 14 are vulcanized at 180°-200° C. for 10-20 minutes, so that rubber layers 15 and non-adhesive layers 16 are formed on the opposite surfaces respectively so as to have a thickness of 50 μm on each surface. Thus, a rubber-laminated material for gaskets having the whole thickness of 0.35 mm was obtained.

TABLE 1

| Composition | NBR rubber compound for primer | (Unit: PHR) NBR rubber compound for rubber layer |
|---|---|---|
| nitrile rubber | 100 | 100 |
| hydrozincite | 3-10 | 5-15 |
| stearic acid | 0.3-1.0 | 0.5-1.0 |
| carbon | 100-150 | 100-150 |
| coumarone-indene resin | 20-60 | 0-5 |
| aging inhibitor | 0-5 | 5-8 |
| plasticizer | — | 10-20 |
| retarder | — | 1-2 |
| wax | — | 5-10 |
| sulfur | 0.5-4 | 0.5-4 |
| vulcanization accelerator | — | 2-6 |

EXAMPLES 2-6

Rubber-laminated materials for gaskets were obtained under the producing conditions of Table 2 in the same manner as in Example 1.

TABLE 2

| Example | Embodiments 1 | 2 | 3 | 4 | 5 | 6 | Comparative Example |
|---|---|---|---|---|---|---|---|
| kind of metal plate | SPCC | SPCC | SUS | SUS | aluminum | aluminum | SPCC |
| thickness of metal plate (mm) | 0.25 | 0.25 | 0.20 | 0.20 | 0.6 | 0.6 | 0.25 |
| surface roughing method | Scotch bright | Scotch bright | Scotch bright | Scotch bright | — | — | Scotch bright |
| degreasing method | alkali degrease | alkali degrease | alkali degrease | alkali degrease | | | alkali degrease |
| chemical conversion treatment method | ion phosphate treatment | ion phosphate treatment | — | — | chromic acid treatment | chromic acid treatment | ion phosphate treatment chromium sealing |
| primer components (weight %) | | | | | | | |
| high-reactive xylene denatured phenol resin | 11 | 11 | 11 | 11 | 11 | 11 | — |
| phenol novolac epoxy resin | 2.6 | — | 2.6 | — | 2.6 | — | — |
| pure phenol resin | — | — | — | — | — | — | 11 |
| rubber for primer (composition: see Table 1) | 6 | 6 | 6 | 6 | 6 | 6 | 6 |
| solvent | 80.4 | 83 | 80.4 | 83 | 80.4 | 83 | 83 |
| rubber layer thickness (μm) (composition: see Table 1) | 50 | 50 | 30 | 30 | 30 | 30 | 50 |
| non-adhesive layer | graphite | graphite | graphite | graphite | graphite | graphite | graphite |
| whole thickness (mm) | 0.35 | 0.35 | 0.26 | 0.26 | 0.66 | 0.66 | 0.35 |
| lattice pattern cutting test | | | | | | | |
| spiral scorling test | | | | | | | |
| antifreeze resistance (120° C. × 168 hours) | 100/100 | 100/100 | 100/100 | 100/100 | 100/100 | 100/100 | 0/100 |
| hot water resistance (95° C. × 72 hours) | no separation | no separation | no separation | no separation | no separation | no separation | separation between surface blister and primer metal |

The operation and effects of the present invention related to the Examples 1-6 are as follows.

First, the operation and effects (a) through (d) are generated by using high-reactive xylene denatured phenol as the principal component of the primer.

(a) Since the high-reactive xylene denatured phenol has less number of hydrophilic functional groups and hydroxyl groups compared with the conventional pure phenol resin (the same applies to the denatured phenol resin such as cashew denatured phenol resin, cresol denatured phenol resin, or the like), the hot water resistance and the alkali resistance have been improved.

(b) The high-reactive xylene denatured phenol is weak alkali because an alkali catalyst is used as synthetic catalyst. Therefore, the durability against antifreeze property (the alkalinity) added with an alkali rust preventive has been improved.

(c) Since an oxymethylene group or an acetal group has been led as the molecular end and binding group in the high-reactive xylene denatured phenol, the cross-linking density has been increased in comparison with the conventional denatured phenol resin. Therefore, the hot water resistance and the alkali resistance have been improved.

(d) In the high-reactive xylene denatured phenol, it is preferable to remove, through refining, a cross-linking preventing component, non-reactive phenol which is a hydrophilic component, a low-melting point component and an amine compound are generated at the time of resin synthesis. As a result, the resin cross-linking density is increased to thereby prevent hot water and an antifreeze from penetrating into the resin.

Thus, there is one subject of the present invention in that the hot water resistance and the antifreeze resistance are improved by using special high-reactive xylene denature phenol resin as the principal component of the primer in place of the conventional phenol group resin.

Second, while water repellency wax has been conventionally used as an ozone deterioration inhibitor, the wax is used to fill pores generated in the rubber layers in drying and vulcanization of rubber to thereby prevent hot water and an antifreeze from penetrating into the primer layers and the adhesion surfaces to thereby improve the adhesion. As the wax, it is preferable to use wax in which isoparaffin wax is richly contained so that the mixing ratio of normal paraffin wax to isoparaffin wax is selected to be within a range of 20-40: 80-60 and in which the bloom speed into the rubber surface is low. It is suitable to select the quantity of addition to rubber to be 5 phr-10 phr. The penetration prevention effect is reduced if the quantity of addition is smaller than 5 phr, and on the contrary the adhesion in the normal state is reduced if the quantity of addition exceeds 10 phr.

Third, by the chromium sealing, the rust prevention effect on the porous phosphate group treated surfaces is improved, formation of moisture and a moist salt on the metal surface is prevented, and an electrochemical reaction is suppressed, so that separation between rubber and metal is prevented.

Fourth, since epoxy resin is neutral, the durability against an alkali antifreeze and water is excellent. The antifreeze resistance and the hot water resistance of the primer mainly containing high-reactive xylene denatured phenol have been further improved by addition of epoxy resin to the primer.

It is suitable to select the quantity of addition of epoxy resin to be 2.0–3.0 weight percent. The effect on the antifreeze resistance and hot water resistance is reduced if the quantity of addition is made smaller than 2.0 weight percent, and, on the contrary, the adhesion between the rubber layer and the primer layer is reduced if the quantity of addition is made larger than 3.0 weight percent.

There is the other subject of the present invention in that the geometric effect upon the hot water resistance and the anti-freeze resistance is generated by combining the foregoing first, second, third, and fourth operations.

EXAMPLES 7-9

To perform the phosphate treatment and the chromium sealing treatment (processing liquid temperature: 50° to 85° C., processing time: 3 to 40 seconds, and adhesion amount: 2 to 200 mg/cm$^2$) as the chemical conversion treatment as shown in Examples 7-9 of Table 3 is effective also in the case of using phenol group resin in place of high-reactive xylene denatured phenol resin as the principal component of the primer. That is, not only the orientation of moisture and mist salts on the metal surface is prevented but an electrochemical reaction is suppressed, so that separation of the primer layers due to hot water is improved.

TABLE 3

| Example | Embodiments | | | Comparative example |
|---|---|---|---|---|
| | 7 | 8 | 9 | |
| kind of metal plate | SPCC | SPCC | SPCC | SPCC |
| thickness of metal plate (mm) | 0.25 | 0.25 | 0.25 | 0.25 |
| surface roughing method | Scotch bright | Scotch bright | Scotch bright | Scotch bright |
| degreasing method | alkali degrease | alkali degrease | alkali degrease | alkali degrease |
| chemical conversion treatment method | ion phosphate treatment chromic sealing | ion phosphate treatment chromic sealing | zinc phosphate treatment chromic sealing | ion phosphate treatment |
| primer components (weight %) | | | | |
| pure phenol resin | 11 | — | — | 11 |
| high-reactive xylene denatured phenol resin | — | 11 | 11 | — |
| rubber for primer (composition: see Table 1) | 6 | 6 | 6 | 6 |
| solvent | 83 | 83 | 83 | 83 |
| rubber layer thickness (μm) (composition: see Table 1) | 50 | 50 | 50 | 50 |
| non-adhesive layer | graphite | graphite | graphite | graphite |
| whole thickness (mm) | 0.35 | 0.35 | 0.35 | 0.35 |
| spiral scorling test (hot water resistance) | | | | |
| condition (95° C. × 168 hours) | no separation | no separation | no separation | separation between surface blister and primer metal |
| condition (95° C. × 500 hours) | no separation | no separation | no separation | separation between surface blister and primer metal |

I claim:

1. A rubber-laminated material comprising:
   a metal plate;
   a primer layer composed of high-reactive xylene denatured phenol resin having an oxymethylene group or an acetal group formed on at least one surface of the metal plate, the at least one surface of the metal plate having been subjected to a chemical conversion treatment; and
   a rubber layer laminated on said primer layer.

2. A rubber-laminated material according to claim 1, wherein a chromium sealing layer of one selected from the group essentially consisting of a chromic (III) acid and a chromic (VI) acid is formed on said chemical conversion treated surface.

3. A rubber-laminated material according to claim 1, wherein said rubber layer is composed of NBR rubber.

4. A rubber-laminated material comprising:
   a metal plate having at least one surface subjected to a chemical conversion treatment;
   a chromium sealing layer selected from the group essentially consisting of a chromic (III) acid and a chromic (VI) acid formed on said chemical conversion treated surface;
   a primer layer formed on said chromium sealing layer; and
   a rubber layer laminated on said primer layer.

5. A rubber-laminated material according to claim 4, wherein said rubber layer is composed of NBR rubber.

* * * * *